Nov. 8, 1927.
R. K. WINNING
1,648,524
METHOD OF FASTENING HANDLE KNOBS
Filed March 14, 1927
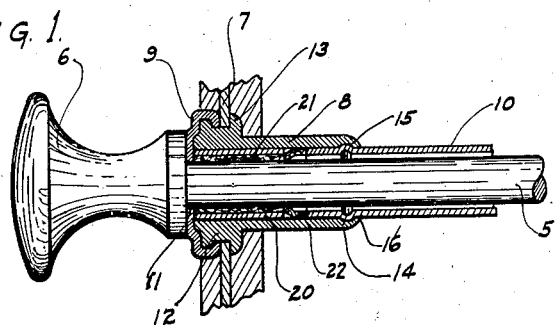
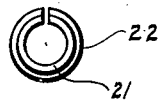
INVENTOR.
Robert K. Winning
BY
Erwin, Wheeler & Choolard
ATTORNEY.

Patented Nov. 8, 1927.

1,648,524

UNITED STATES PATENT OFFICE.

ROBERT K. WINNING, OF WAUWATOSA, WISCONSIN, ASSIGNOR TO CLUM MANUFACTURING COMPANY, OF MILWAUKEE, WISCONSIN, A CORPORATION OF WISCONSIN.

METHOD OF FASTENING HANDLE KNOBS.

Application filed March 14, 1927. Serial No. 175,195.

This invention relates to improvements in friction detent of the character shown in my companion application, Serial No. 79,760 filed January 7, 1926.

It is the object of the present invention to provide a novel, simplified and inexpensive friction medium eliminating the necessity of using a separate resilient axial take-up member.

There is a need for compensating in some manner for differences in length between a detent housing and the parts to be confined therein. It is the purpose of the present invention to provide a construction in which the spring and its co-operative friction member interact with each other and the enclosing casing to the end that both parts are inexpensively confined against movement.

In the drawings:

Figure 1 is an axial section through a friction detent device embodying this invention.

Figure 2 is an end elevation of a fibre bushing made in accordance with this invention.

Like parts are identified by the same reference characters throughout the several views.

The device illustrated may be used, among other purposes, as the actuating member of a Bowden wire control. An axially movable rod 5 is provided with a manually operable handle 6. The rod is supported for reciprocation through the panel 7 by means of a housing which includes a mounting member 8, a cap 9, and a tube 10. The cap is provided with an aperture 11 substantially the size of rod 5, and is permanently engaged to flange 12 on the mounting member 8. The mounting member is upset at 13 to clamp the panel 7 and the marginal portion of cap 9 against flange 12. In order to fix the position of tube 10, the mounting member 8 is provided with a channel at 14 to receive an annular rib 15 in said tube, and the periphery of the mounting member is thereupon upset at 16 over the rib 15 to hold the tube 10 in rigid connection with the mounting member.

In order frictionally to oppose the movement of rod 5, I provide a contractile spring 20 which is confined against material axial movement and which, in contraction, compresses a friction bushing 21 upon the shaft. If the spring and bushing are not adequately confined against axial movement there will be a certain amount of end play of the shaft which is objectionable. At the same time the manufacture of these devices in production and at low expense does not admit of the machine work which would be necessary to fit the parts non-resiliently together without end play. I have therefore, provided the friction bushing 21, which is preferably made of fibre or the like, with a bell shaped enlargement 22 which abuts the end of tube 10 in registry therewith and is substantially of the diameter of the interior of mounting member 8 when the bushing proper at 21 is contracted upon rod 5.

The fibre being more or less yieldable it will be obvious that it will conform to any slight variation in the distance from the end of the spring 20 to the end of tube 10. If the spring 20 is slightly longer than the minimum dimension normally found in such springs, the result will be that the fibre bushing will be subjected to a thrust in the assembly of the parts which will slightly reduce under pressure the axial extent of the bell shaped portion 22 thereof. Thus regardless of the exact length of the split tubular spring 20 the spring will always seat against the expanded portion 22 of the bushing, and will thereby be confined against axial displacement during the reciprocation of the rod 5. At the same time the bushing will perform its normal function of transmitting frictionally to the rod the compression exerted by the contractile spring thereabout.

I claim:

1. The combination with a chamber and a rod reciprocable therethrough, of a yieldable bushing encircling said rod and abutting said chamber at its end, and a contracting spring exerting pressure through said bushing upon said rod, said bushing having a portion yieldably engaging a portion of said spring and adapted yieldably to maintain the position of said spring axially within said chamber.

2. The combination with a chamber and a rod reciprocable therethrough, of a yieldable bushing encircling said rod and provided with a flared end portion abutting the end of said chamber, and a contractile spring exerting pressure through said bushing upon said rod and abutting said flared portion of said bushing, whereby to be confined against axial movement thereby.

3. The combination with an axially reciprocable rod, of a friction bushing encircling said rod provided with a yieldable enlargement, a contractile spring encircling said bushing and abutting said enlargement, and a support limiting the axial movement of said bushing in the direction in which said spring abuts said enlargement.

4. The combination with a tubular chamber and a rod axially reciprocable therethrough, of a friction bushing upon said rod having a bell shaped enlargement at its end substantially of the interior diameter of said chamber when said bushing is engaged upon said rod, said enlargement being in abutment with the end of said chamber, and a contractile spring confined within said chamber yieldably engaged at its end by said enlargement and wound upon the smaller portion of said bushing in contractile pressure engagement therewith.

ROBERT K. WINNING.